United States Patent
Ho et al.

(10) Patent No.: US 8,904,412 B2
(45) Date of Patent: Dec. 2, 2014

(54) DYNAMIC PERFORMANCE DATA COLLECTION IN LARGE COMPUTER SERVERS

(71) Applicant: International Business Machines Corporation, Armonk, NY (US)

(72) Inventors: Kam Ho Ho, Dale City, CA (US); Tony Hui Xu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/626,910

(22) Filed: Sep. 26, 2012

(65) Prior Publication Data

US 2014/0089941 A1  Mar. 27, 2014

(51) Int. Cl.
G06F 9/44 (2006.01)
G06F 11/00 (2006.01)

(52) U.S. Cl.
USPC .............. 719/328; 714/25; 714/47.1; 714/48; 717/127

(58) Field of Classification Search
None
See application file for complete search history.

(56) References Cited

U.S. PATENT DOCUMENTS

| | | | | |
|---|---|---|---|---|
| 5,119,377 | A * | 6/1992 | Cobb et al. | 714/38.11 |
| 5,581,482 | A * | 12/1996 | Wiedenman et al. | 702/186 |
| 5,651,112 | A * | 7/1997 | Matsuno et al. | 714/47.1 |
| 5,872,976 | A * | 2/1999 | Yee et al. | 717/127 |
| 6,161,200 | A * | 12/2000 | Rees et al. | 714/38.13 |
| 7,376,549 | B2 * | 5/2008 | Horikawa | 703/22 |
| 7,426,731 | B2 | 9/2008 | Findeisen | |
| 7,702,642 | B1 * | 4/2010 | Wolfman et al. | 707/999.101 |
| 7,774,790 | B1 * | 8/2010 | Jirman et al. | 719/318 |
| 7,853,929 | B2 | 12/2010 | Klein | |
| 7,913,233 | B2 | 3/2011 | Kumar | |
| 2003/0061542 | A1 * | 3/2003 | Bates et al. | 714/38 |
| 2005/0076113 | A1 * | 4/2005 | Klotz et al. | 709/224 |
| 2006/0159017 | A1 * | 7/2006 | Mun et al. | 370/230 |
| 2006/0259830 | A1 * | 11/2006 | Blevin et al. | 714/45 |
| 2007/0103175 | A1 * | 5/2007 | Eigler | 324/754 |
| 2008/0235538 | A1 * | 9/2008 | Horley et al. | 714/47 |
| 2010/0332473 | A1 * | 12/2010 | Brodsky et al. | 707/736 |
| 2011/0202688 | A1 * | 8/2011 | Shah et al. | 710/5 |
| 2012/0144246 | A1 * | 6/2012 | Dreyfoos et al. | 714/47.1 |
| 2013/0036330 | A1 * | 2/2013 | Drukman et al. | 714/38.1 |
| 2013/0198729 | A1 * | 8/2013 | Turner et al. | 717/151 |
| 2013/0254783 | A1 * | 9/2013 | McGuire et al. | 719/328 |

FOREIGN PATENT DOCUMENTS

JP     09034754 A   *  2/1997  .............. G06F 11/34

OTHER PUBLICATIONS

"Application Programming on z/OS", Copyright IBM Corporation 2006, 2010, pp. 1-80, web version: http://publib.boulder.ibm.com/infocenter/zos/basics/index.jsp?topic=/com.ibm.zos.zappldev/zappldev_3.htm.

* cited by examiner

Primary Examiner — Charles E Anya
(74) Attorney, Agent, or Firm — Feb R. Cabrasawan; Patricia B. Feighan (57) ABSTRACT

A mechanism is provided for collecting one or more performance metrics. A plurality of source code instructions is provided. The source code instructions include a plurality of macro calls. Each of the plurality of macro calls includes a plurality of predetermined parameters. A plurality of object code instructions corresponding to the plurality of source code instructions is executed. In response to receiving a signal identifying at least one of the plurality of macro calls contained in the source code instructions and identifying a desired level of granularity, performance metrics are collected using the identified macro call in accordance with the desired level of granularity.

17 Claims, 6 Drawing Sheets

```
1   #include <stdio.h>
2
3   int
4   main () {
    ...
10  /* call the asm macro */
11  asm_zDPSM (12, 99);     ←— 406
12  function counter () {   ←— 402
    ...
19  }
    ...
28  /* call the asm macro */
29  asm_zDPSM (13, 5);      ←— 408
    ...
36  /* call the asm macro */
37  asm_zDPSM (14, 99);     ←— 410
    ...
50  /* call the asm macro */
51  asm_zDPSM (15, 5);      ←— 412
    ...
59  return 0;
60  }
```

*FIG. 4A*

```
 1  PLIMATH:  PROC OPTION (MAIN);
 2            DCL CEESLOG ENTRY OPTIONS (ASM) EXTERNAL;
 3            DCL CEESIMOD ENTRY OPTIONS (ASM) EXTERNAL;
 4            DCL ZDPSM ENTRY OPTIONS (ASM) EXTERNAL;
 5            DCL ARG1 RESULT REAL FLOAT DEC (6);
 6            DCL ARGM1 ARGM2 RES2 FLOAT BINARY (21)
 7            DCL FC CHARACTER (12);
 8            DCL ID CHARACTER (10);
 9            DCL LEVEL CHARACTER (2);
10            /* Call performance data macro, which has two input parameters*/
12            CALL ZDPSM ('0000000012', '99');  ←—456
13            /* Call log base e routine*/
14            CALL CEESSLOG (ARG1, FC, RESULT);
15            /* Call performance data macro, which has two input parameters*/
16            CALL ZDPSM ('0000000013', '5');  ←—458
17            IF (FC = '00000000000' X)
18                THEN DO
19                    PUT SKIP LIST
                          ('Error occurred in call to CEESSLOG.');
     ...
30            CALL ZDPSM ('0000000014', '99')  ←—460
31            DCL CEESIMOD (ARGM1, ARGM2, FC, RES2);
32            CALL ZDPSM ('0000000015', '5')  ←—462
```

454 →  (line numbers column)
450 → (top)
452 → (right brace covering lines 1–32)

DYNAMIC PERFORMANCE DATA COLLECTION IN LARGE COMPUTER SERVERS

BACKGROUND

The disclosure relates generally to performance monitoring, and more specifically to dynamic performance data collection in large computer servers.

An IBM System z® computer is a product line of large computer servers or mainframes based on the z/Architecture® provided by International Business Machines Corporation (IBM®) of Armonk, N.Y. IBM System z® computers can utilize a derivative of the Multiple Virtual Storage (MVS) operating system, which is a robust mainframe operating system utilized by many generations of IBM® mainframe computers. Derivatives of the MVS™ operating system can include the OS/390® operating system and IBM z/OS® (IBM System z®, z/Architecture®, IBM®, OS/390® and IBM z/OS® are registered trademarks of International Business Machines Corporation, located in Armonk, N.Y.).

IBM System z® computers typically run mainframe applications based on the programming languages designed for these environments, such as COBOL, PL/I and Assembler. These mainframe applications typically handle high volumes of data and/or high transaction rates within complex systems and user environments. Therefore, these applications are usually critical to the business in which the IBM System z® computer is installed.

Both execution time and cost are factors that must be considered when running mainframe applications. For example, execution time may be critical with respect to the performance of batch systems and with respect to particular response times required by certain applications (such as web-based or other on-line systems). However, increasing data volumes due to higher business complexity can cause batch process to exceed desired time limits and can increase the response times of critical web-based applications to unacceptable levels. Furthermore, mainframe systems are often associated with high operating costs since many businesses pay for mainframes on a usage basis (for example, license costs are often coupled to the number of MIPS ("Million Instructions Per Second") in a mainframe installation) and also may pay fixed license costs for mainframe software. Given the increasing pressure to reduce IT spending, these costs have become a major problem to many businesses using mainframe computers.

Given the increasing execution time requirements and cost pressures, businesses are forced to evaluate their current mainframe installations. One option available to such businesses is to upgrade the computer hardware. However, this creates additional fixed costs and is typically only a good choice if money is not a primary decision-driving factor or if the company needs to react immediately. Another option is to optimize and tune the system environment and the applications running in the environment. Utilities have been developed to gather specific performance related data in a mainframe environment, but to date these programs have been largely focused on measuring performance at a mainframe job level. These utilities do not provide a flexible way to capture data at more granular levels, such as, for example, a single line of assembler instruction.

SUMMARY

In one aspect, a method for collecting one or more performance metrics is provided. The method comprises providing a plurality of source code instructions having a plurality of macro calls among the plurality of source code instructions. Each of the plurality of macro calls includes a plurality of predetermined parameters. The method further comprises executing a plurality of object code instructions corresponding to the plurality of source code instructions. The method further comprises, in response to receiving a signal identifying at least one of the plurality of macro calls and identifying a desired level of granularity, collecting the one or more performance metrics using the identified at least one of the plurality of macro calls in accordance with the desired level of granularity.

In another aspect, a computer program product for collecting one or more performance metrics is provided. The computer program product comprises one or more computer-readable tangible storage devices and a plurality of program instructions stored on at least one of the one or more computer-readable tangible storage devices. The plurality of program instructions comprises program instructions to provide a plurality of source code instructions having a plurality of macro calls among the plurality of source code instructions. Each of the plurality of macro calls includes a plurality of predetermined parameters. The plurality of program instructions further comprises program instructions to execute a plurality of object code instructions corresponding to the plurality of source code instructions. The plurality of program instructions further comprises program instructions to, in response to receiving a signal identifying at least one of the plurality of macro calls and identifying a desired level of granularity, collect the one or more performance metrics using the identified at least one of the plurality of macro calls in accordance with the desired level of granularity.

In yet another aspect, a computer system for collecting one or more performance metrics is provided. The computer system comprises one or more processors, one or more computer-readable tangible storage devices, and a plurality of program instructions stored on at least one of the one or more storage devices for execution by at least one of the one or more processors. The plurality of program instructions comprises program instructions to provide a plurality of source code instructions having a plurality of macro calls among the plurality of source code instructions. Each of the plurality of macro calls includes a plurality of predetermined parameters. The plurality of program instructions further comprises program instructions to execute a plurality of object code instructions corresponding to the plurality of source code instructions. The plurality of program instructions further comprises program instructions to, in response to receiving a signal identifying at least one of the plurality of macro calls and identifying a desired level of granularity, collect the one or more performance metrics using the identified at least one of the plurality of macro calls in accordance with the desired level of granularity.

DETAILED DESCRIPTION

Embodiments of the present invention will now be described with reference to the figures. Embodiments of the present invention apply equally to all forms of large computer servers including mainframes. However, focus is directed to IBM System z® computers by means of example and explanation in the description of embodiments of the present invention.

The method of collecting performance metrics described herein provides flexibility, by using different levels of granularity, for capturing performance metrics, such as elapsed execution time described further below, for a variety of computer programs. As used herein, the term "level of granularity" refers generally to a value indicating a level of importance of a particular location in the source code in which a macro call has been inserted. It is noted that the term "macro call", as used herein, refers to a single programming statement that is replaced, at compile time, by a plurality of programming instructions defined in a corresponding macro definition. In accordance with an embodiment of the present invention, performance metrics may be collected at different levels of detail without recompilation of the computer programs executing in a production environment. A plurality of macros, which may be called on to expand into operable code, may be inserted in the source code at various locations. The programmer may dynamically select or deselect a source code segment within an application program for which performance metrics may be collected. This may be done from the command line while the application program is running by identifying macros associated with starting and ending points within the given source code segment. Advantageously, each macro may be assigned a granularity level, which enables the programmer to control the granularity of collected data. In various embodiments, performance metrics may include elapsed execution time, CPU time, or the like.

The elapsed execution time (as opposed to CPU time) for executing a portion of code can be measured by retrieving the hardware clock timer values just before and just after executing the code fragment. The execution time elapsed between two points of references in the code may be calculated as the difference between the two timer values, and may be referred to as elapsed time. In other words, the elapsed execution time is the difference in the hardware clock timer values retrieved at the beginning and at the end of the given fragment of code.

The elapsed execution time cannot always be used to accurately measure the consumption of CPU time by an application program. This is because the application program in question can become idle as a result of the operating system action. Therefore, to measure the CPU time spent during execution of a fragment of code using the elapsed time, the correct results would be obtained only if the execution of the application program was not preempted during the measurement period. Accordingly, measurement of the CPU time may be more appropriate metric than the elapsed execution time in some situations.

Figure 1:
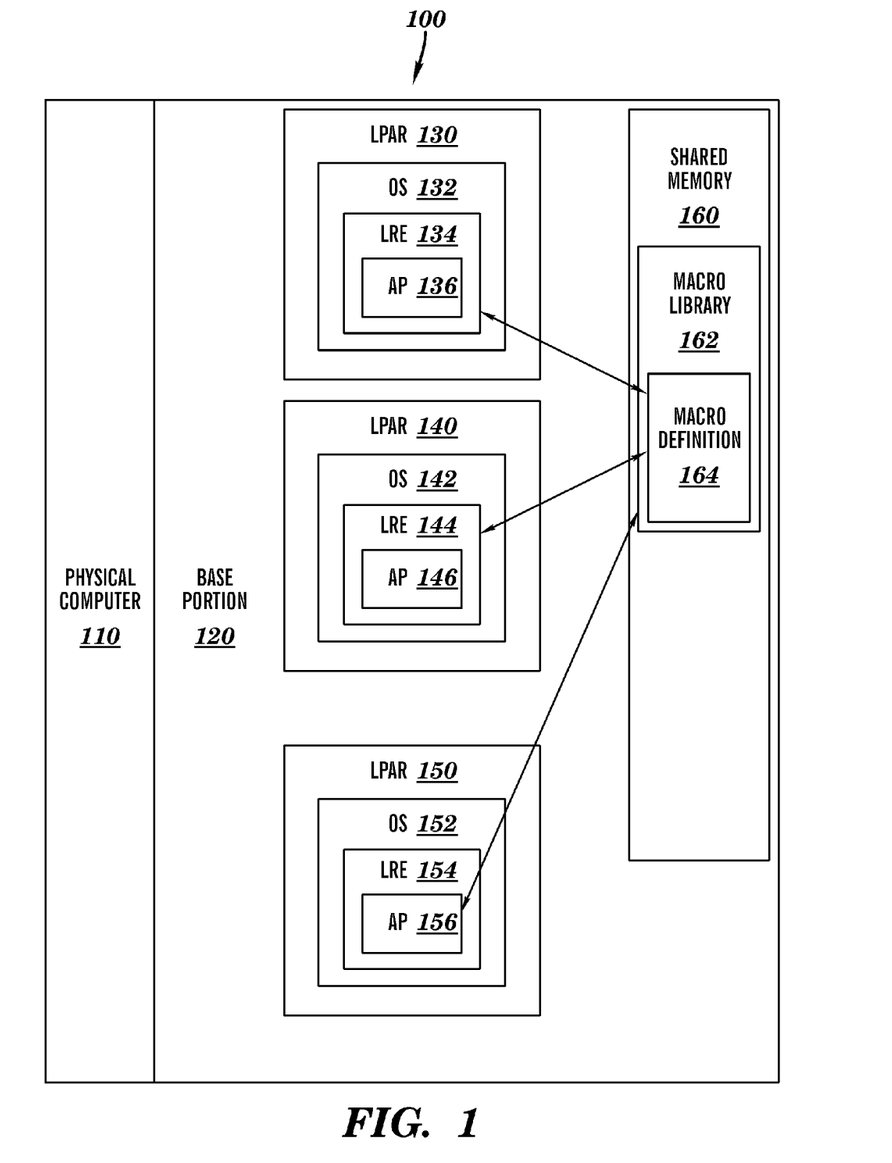
FIG. 1 is a block diagram of a logically partitioned computer system in which an embodiment of the present invention can be implemented.

FIG. 1 is a conceptual block diagram of a logically partitioned computer system generally designated 100 in which an embodiment of the present invention can be implemented. FIG. 1 is an illustration of one implementation and is not intended to imply any limitation with regard to the environments in which different embodiments may be implemented. Many modifications to the depicted environments may be made.

In one embodiment logically partitioned computer system 100 can be a physical computer 110 such as an IBM® System z® mainframe computer (offered by International Business Machines Corporation, Armonk, N.Y.) although the present embodiment can be implemented in other server computers or personal computers as well. Logically partitioned computer system 100 may include multiple logical partitions 130, 140, 150. Each logical partition 130, 140, 150 may be capable of functioning as a separate system. That is, each logical partition can be independently reset, initially loaded with an operating system, if desired, and operate with different programs. In this particular example, each logical partition 130, 140, 150 may include an operating system 132, 142, and 152, respectively which may provide standard operating system functions such as I/O, communication, etc. to its applications. It should be noted that resident operating systems running in the various logical partitions may differ. In one embodiment, operating system 132 is the IBM z/OS® operating system, which is offered by International Business Machines Corporation, Armonk, N.Y., while the other operating systems 142 and 152 may be, for example, but not limited to, Linux operating system, which is open source software that is readily available on the Internet. Each operating system 132, 142, 152 may provide independent programming language runtime environments (LREs) 134, 144, and 154, respectively, in which different applications, such as applications 136, 146, and 156 may run. Each logical partition 130, 140, 150 may be capable of concurrently executing a number of different applications, such as application programs 136, 146, and 156, as shown in FIG. 1. By way of example, application programs 136, 146, and 156 can be a C program, PL/I program, Java program, assembler program, and the like. Base portion 120 participates in the actual logical partitioning of the physical computer 110 and its resources. For example, base portion 120 may partition the CPU(s), partition memory, partition I/O, etc.

In some cases a user may be interested in optimizing and tuning the system environment and the applications running in the environments 134, 144, and 154. In accordance with an embodiment of the present invention, application programs 136, 146, and 156 may include a plurality of macro calls among the plurality of source code instructions constituting the respective application program 136, 146 and 156. This plurality of macro calls enables the user to dynamically adjust the collection of performance metrics without recompiling application programs 136, 146, and 156 as discussed below with reference to FIGS. 4a, 4b, and 5. Physical computer 110 may also include memory area 160 which may be shared by all of the logical partitions 130, 140, 150, etc. Therefore, each logical partition 130, 140, 150 can directly address and access the shared memory area 160 to read data therefrom or write data thereto. In an embodiment, shared memory area 160 may include a macro definition library 162. Macro definition library 162 may store a plurality of macro definitions 164 that define the plurality of macros included in the application programs 136, 146, and 156. The respective logical partition may access the macro library 162 on behalf of the corresponding application program 136, 146 and 156.

Figure 2:
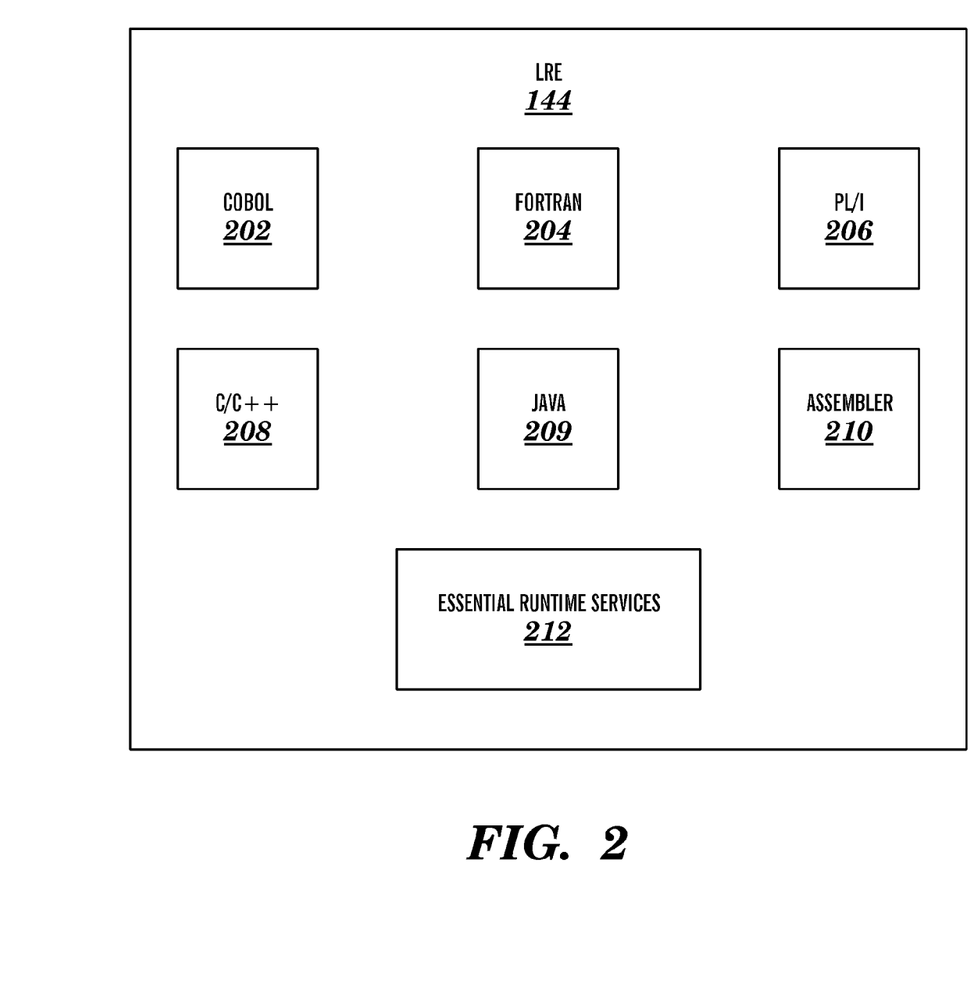
FIG. 2 is a block diagram representation of language runtime environments illustrated in FIG. 1 in accordance with an embodiment of the present invention.

FIG. 2 is a block diagram illustrating an exemplary programming LRE illustrated in FIG. 1 in accordance with an embodiment of the present invention. Embodiments of the present invention apply equally to all LREs 134, 144, 154. However, focus is directed to LRE 144 by means of example and explanation in the description of embodiments of the present invention. In software programming, a programmer writes code in a textual form ("source code"). This code is typically translated (by a program called a compiler, which is included in LRE 144) into another form (for example, "object code" contained in object files) which can be executed directly by a computer, such as physical computer 110. In other words, source code is typically human-readable but cannot be executed directly. Object code is not human readable but typically can be executed by a computer. An application typically is a collection of one or more programs (referred to herein as application programs 136, 146, 156) cooperating to achieve particular objectives, such as inventory control or payroll. LRE 144 illustrated in FIG. 2 provides a framework within which an application runs. For example, during the creation of an executable version of the application it may be normal practice to combine a plurality of files (run units) into a single larger executable file, for example, when two or more object files are combined into a dynamic link library, or two or more class files are combined into a single jar file in the Java® (Java is a registered trademark of Oracle® Corporation located in Redwood Shores, Calif.) programming environment. Such a combination process is known as link-editing (or deployment in the Java® case). Thus, LRE 144 may include both compiler and linker programs.

The language-specific portions of LRE 144 may provide language interfaces and specific services that are supported for each individual language, and that can be called through a common callable interface. LRE 144 may include, for example, but not limited to, the following interfaces: Cobol interface 202, Fortran interface 204, PL/I interface 206, C/C++ interface 208, Java interface 209, and Assembler interface 210. Each of the interfaces 202, 204, 206, 208, 209, and 210 may include language specific libraries. In addition, LRE 144 may include essential runtime services interface 212. Essential runtime services interface 212 may include common library services, such as math or date and time services, that are commonly needed by programs running on the system. Essential runtime services interface 212 may also include basic routines that support starting and stopping programs, allocating storage, communicating with programs written in different languages, and indicating and handling conditions.

An embodiment of the present invention proceeds with reference to the IBM z/OS® environment. However, other environments provide similar functions and operations. This embodiment of the present invention may implement the plurality of macro calls as IBM z/OS® assembler programs in which run units are generated by compiling assembler language program (source code) into object decks. An assembler language is considered a second generation language (2GL) because it is just one step up from the native language of the hardware, called machine language, which is a set of instructions in the form of combinations of ones and zeros. It should be noted that the act of compiling an assembler program does not produce anything directly executable but instead produces an object deck (run unit) which is source for a linkage editor (also known as a binder). The linkage editor may then be used to combine a plurality of object decks into a single executable file. In an embodiment of the present invention, an executable assembler program 302 may contain one or more macro definitions 164, as described below in conjunction with FIG. 3.

Figure 3:
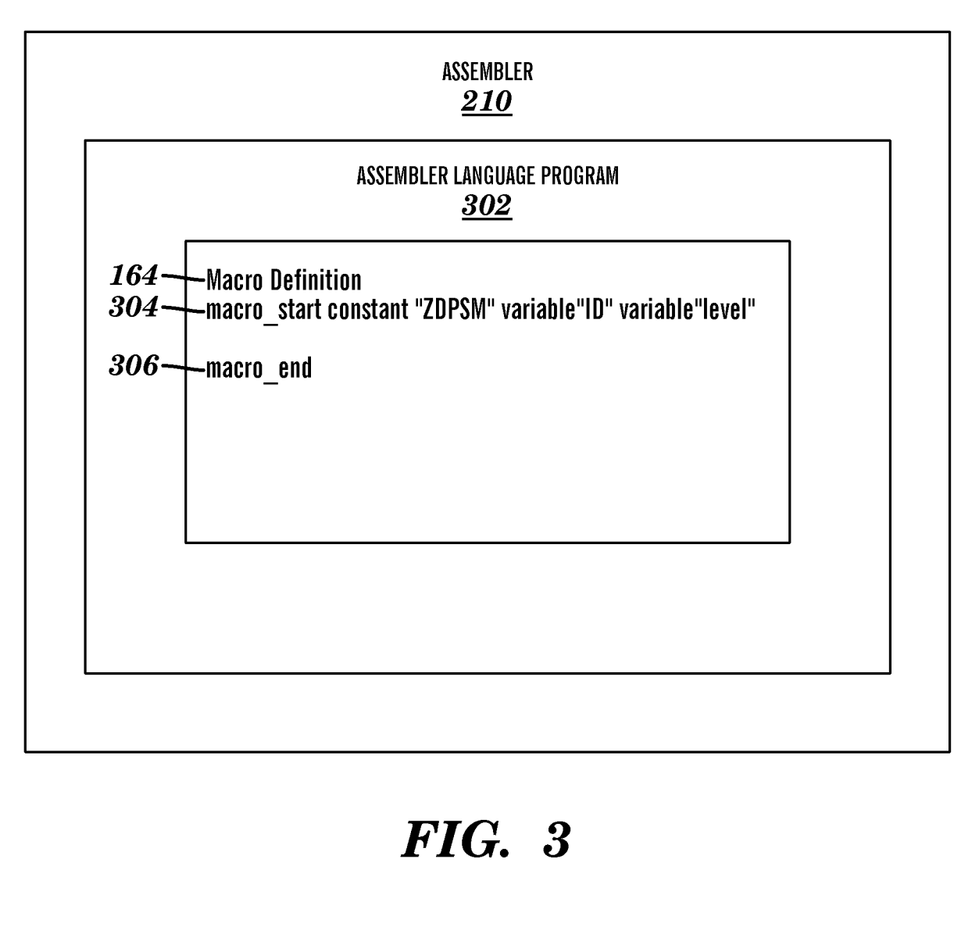
FIG. 3 is a block diagram illustrating an assembler language program having a macro definition in accordance with an embodiment of the present invention.

FIG. 3 is a block diagram illustrating an assembler language program having a macro definition in accordance with an embodiment of the present invention. Assembler interface 210 may include a macro processor (not shown), which may be used, in accordance with an embodiment of the invention, to receive and process an assembler language program 302 that contains at least one macro definition 164. Specifically, in an embodiment, macro definition 164 may contain a reserved word 304 (e.g. "macro_start") that indicates the start of a macro and another reserved word 306 (e.g. "macro_end") that indicates the end of the macro. As would be apparent to a skilled artisan macro definition 164 may further include a plurality of statements written in assembler programming language that follow the start 304 and precede the end 306 of the macro definition 164. For example, macro definition 164 may include a plurality of assembler language statements which will evaluate macro parameters such as, for example, a "level" and an "ID" parameter. Macro definition 164 may further include assembler language statements that will trigger collection of the plurality of performance metrics, as discussed below in conjunction with FIG. 5.

Figure 4A:
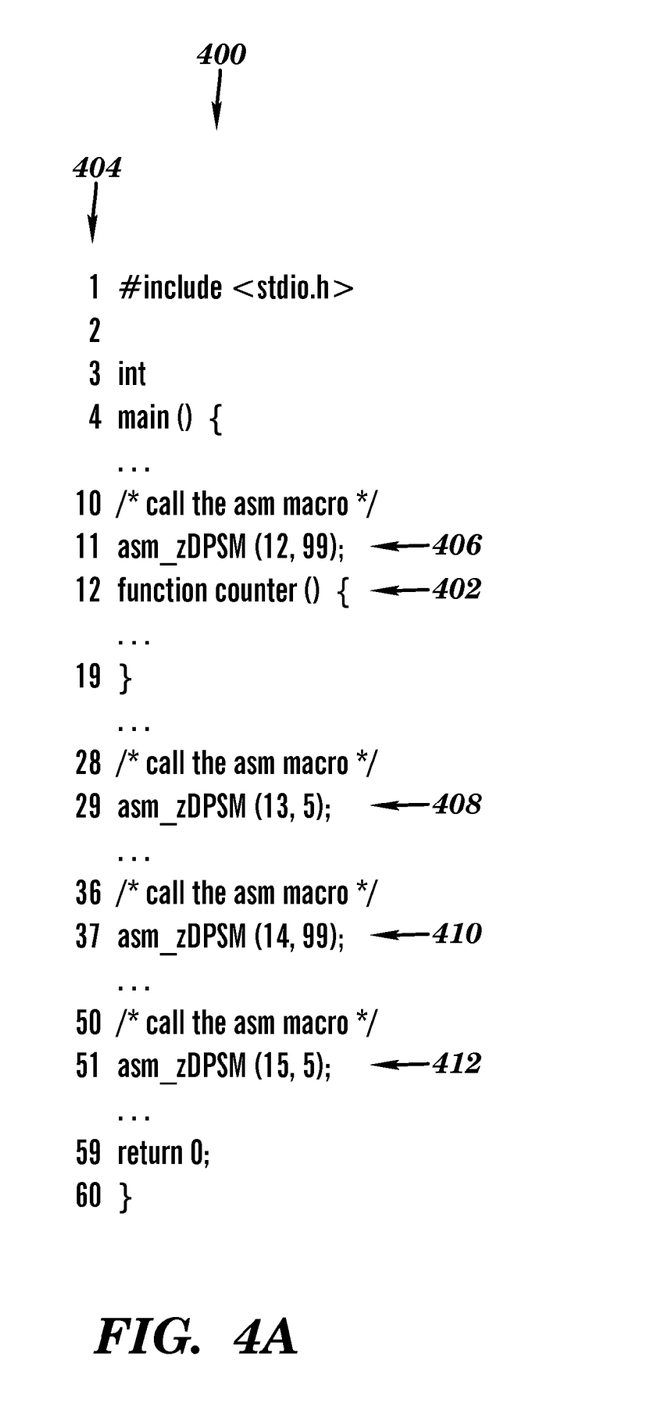
FIG. 4A depicts a portion of an exemplary C application program having a plurality of macro calls in accordance with an embodiment of the present invention.

FIG. 4A depicts a portion of an exemplary C application program 400 having a plurality of macro calls in accordance with an embodiment of the present invention. The source code of the C application program 400 comprises a plurality of instructions or statements, such as, for example, statement 402, written in "C" language. Each line of C application program 400 may be associated with a line number 404. In this example, line 1 represents library invocation in C language. Lines 4-60 contain main function code, lines 12-19 represent counter function portion of the code. As illustrated in FIG. 4A, application programmers may insert a plurality of macro calls 406, 408, 410, 412, shown on lines 11, 29, 37, and 51, respectively, among the plurality of source code instructions. In an embodiment of the present invention, each macro invocation (call) 406, 408, 410, 412 may include at least two parameters, such as, for example, ID and level. In an embodiment of the present invention, the ID parameter of the macro call may enable application programmers to identify a particular location in a source code that could be used either as a starting point or ending point for collecting desired performance metrics. According to an embodiment of the present invention, the level parameter included in the macro call, such as 406, 408, 410, and 412 may advantageously indicate the level of importance that application programmer may assign to the particular location associated with the corresponding macro invocation. For example, IDs associated with macro calls 406 and 410 may have values '12' and '14', respectively, where macro call 406 may be a starting point for collecting performance metrics and macro call 410 may be an ending point for collecting performance metrics. The level parameter value may be equal to '99' for both macro calls 406 and 410. In an embodiment of the present invention, assigned value '99' may represent the highest level of importance, while assigned value '1' may represent the lowest level of importance. Once the plurality of macro invocations 406, 408, 410, 412 has been inserted at various locations throughout the application program 400, as shown in FIG. 4A, an application programmer may compile the source code of C application program 400. In other words, an interface corresponding to "C" programming language 208 (shown in FIG. 2) within the LRE 144 may translate the source code into "object code", which can be executed directly by a computer, such as physical computer 110. It should be noted that a compiler program may access macro library 162 to replace each of the plurality of macro invocations 406, 408, 410, 412 with, for example, the assembler code contained in the macro definition 164. Continuing with the foregoing example, once LRE 144 starts executing object code corresponding to the C application program 400, an application programmer may dynamically control the collection of performance metrics, without recompiling the source code, using an operating system command discussed below in conjunction with FIG. 5.

Figure 4B:
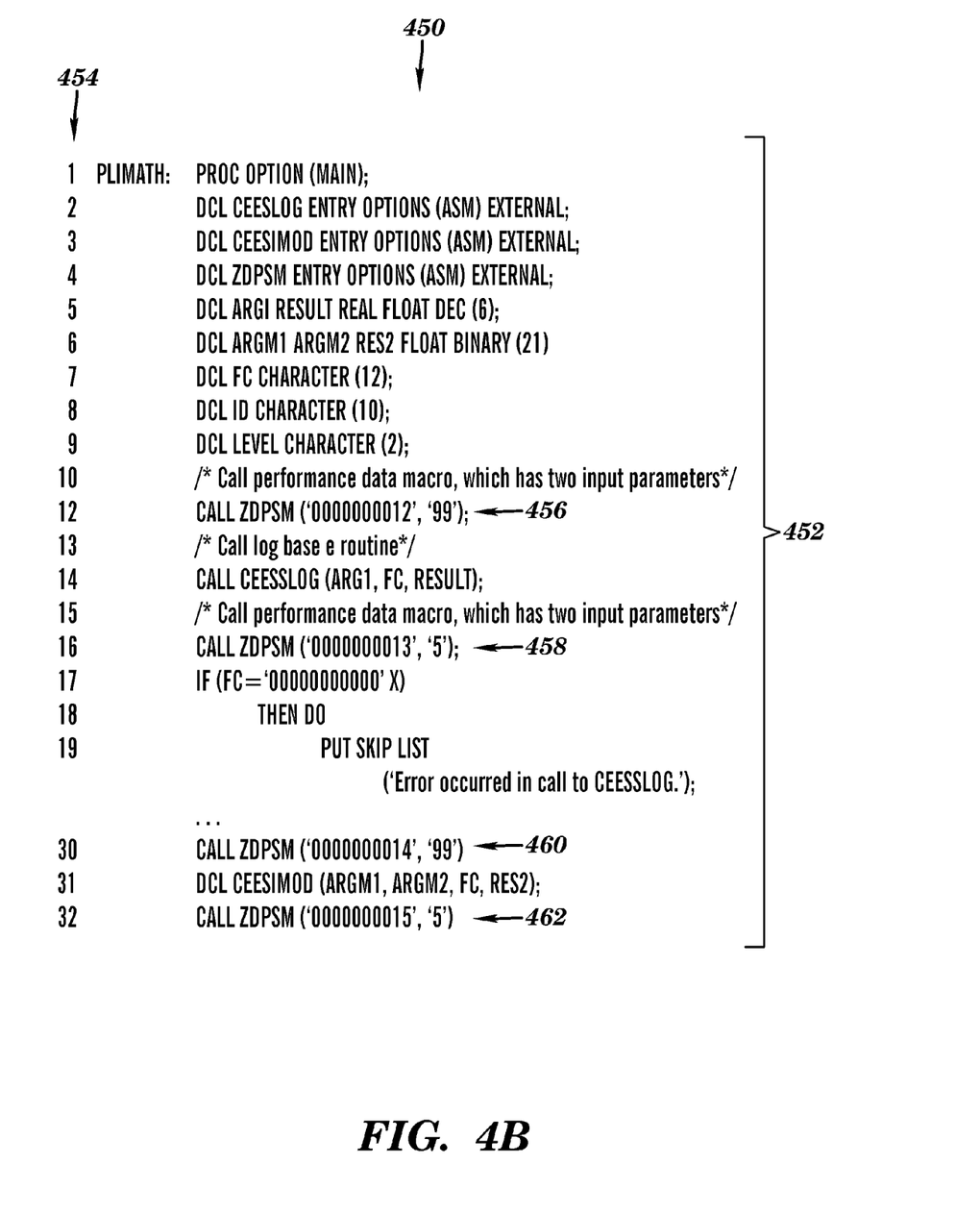
FIG. 4B depicts a portion of an exemplary PL/I application program having a plurality of macro calls in accordance with an embodiment of the present invention.

FIG. 4B depicts a portion of an exemplary PL/I application program 450. The source code of the PL/I application program 450 may include a plurality of instructions or statements 452 written in "PL/I" language. Each line of PL/I application program 450 may be associated with a line number 454. In this example, lines 2-9 define various functions and parameters. As illustrated in FIG. 4B, application programmers may insert a plurality of macro calls 456, 458, 460, 462 among the plurality of PL/I statements (instructions) 452. In an embodiment of the present invention, similarly to a macro call invocation in the "C" language program 400, each macro invocation (call) 456, 458, 460, and 462 in the PL/I application program 450 may include at least two parameters, such as, for example, an ID parameter and a level parameter. Thus, FIG. 4B illustrates that the plurality of macro calls 456, 458, 460, and 462 may be invoked in the PL/I program 450 in a similar fashion as the macro calls in the "C" program.

Figure 5:
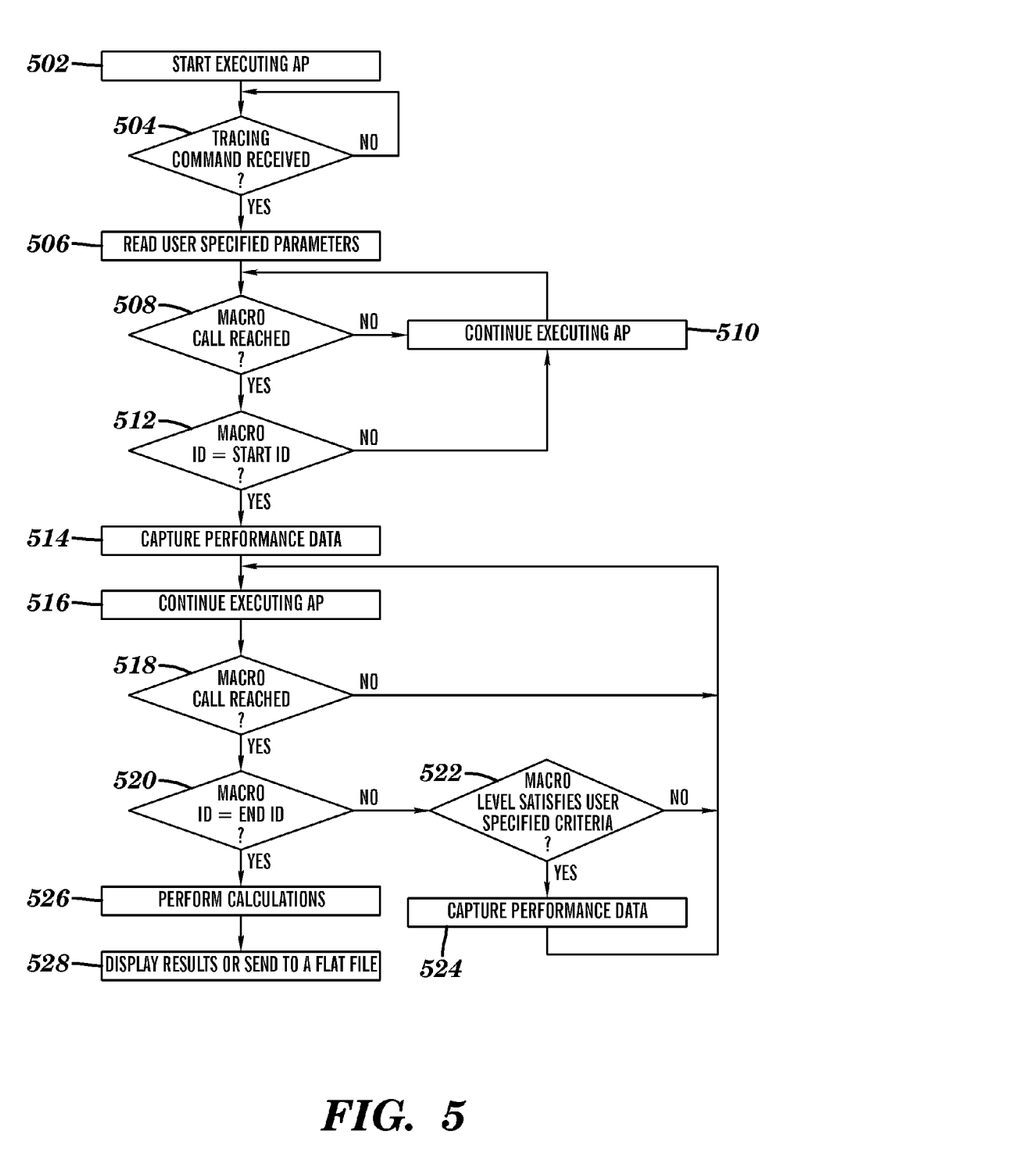
FIG. 5 is a flowchart of a method for collecting one or more performance metrics performed by a language runtime environment executing an application program having a plurality of macro calls in accordance with an illustrative embodiment.

FIG. 5 is a flowchart of a method for collecting one or more performance metrics performed by a LRE executing an application program having a plurality of macro calls in accordance with an illustrative embodiment. In an exemplary embodiment, an LRE, such as the LRE 144 included in the LPAR 140, may be executing an application program, such as the application program 146 written in, for example, PL/I language and having a plurality of macro calls 456, 458, 460, 462 included among a plurality of PL/I statements 452, as shown in FIG. 4B. It should be noted that FIG. 4B illustrates a source code of an exemplary application program 146. As previously indicated, LRE 144 may include a compiler program (not shown) which can translate the source code into an object code executable by physical computer 110. At 502, LRE 144 may start executing application program 146 according to program instructions stored in an application program object file containing the object code. In an embodiment of the present invention, LRE 144 may execute application program 146 until it receives (decision 504) a signal generated by, for example, OS 132 in response to a specific user entered operating system command. In an embodiment, a user, such as an application programmer, interested in gathering performance related metrics with respect to application program 146 may enter a command which specifies a plurality of predefined parameters. By way of example and not limitation, the following command may be utilized:

set zDPS START (ID1), END (ID2), LOC (JOB1), LEVEL (>5), DSN('SYS1.OUTPUT1'), REPEAT (10)

While the current example uses a "set zDPS" operating system command name, where zDPS may stand for IBM z/OS® Dynamic Performance Solution, actual command names may differ in various embodiments. In accordance with an embodiment of the present invention, a value (ID1) of a first parameter (START) may indicate an identification information of a macro call corresponding to a location in a source code that should be used as a starting point for collecting desired performance metrics. For example, a user may specify the first parameter value to be equal to "0000000012", indicating that macro call 456 (shown in FIG. 4B) represents a starting point for gathering desired performance metrics. A value (ID2) of the second parameter (END) may indicate an ID of a macro call corresponding to a location in a source code that should be used as a termination point for collecting desired performance metrics. For example, the user may specify the second parameter value to be equal to "0000000014", indicating that macro call 460 (shown in FIG. 4B) represents the point in the source code beyond which the desired performance metrics should not be collected. A third parameter (LOC) may include, for example, identification information for identifying a process (or job) corresponding to a particular application program 146 being executed. In accordance with an embodiment of the present invention, one of the predefined parameters, such as fourth parameter LEVEL, may be utilized to control granularity of captured data. In other words, this parameter enables one to implement fine-grained performance data collection. In an embodiment, the level values may range from about 1 to about 99, where 99 indicates, for example, the highest importance value and 1 indicates the lowest importance. In some embodiments, the LEVEL parameter along with the numeric value may include a comparison operator, which may be used by LRE 144 to compare the user specified numeric value, with a plurality of predefined level values assigned to each macro call. The comparison operator can be an equality ("="), an inclusive inequality ("<=", ">="), an exclusive inequality ("<", ">"), or the like. For illustrative purposes only, assume that the user has inserted five different macro calls at five different locations in the source code and assigned levels 1, 10, 35, 55, and 99 to each of those macro calls respectively. When the application program runs the user may use the LEVEL parameter of the exemplary "set zDPS" command to select which locations in the source code should be included for performance metrics collection purposes. For example, if the user specifies the LEVEL to be greater than or equal to 30, only the last three locations (associated with the corresponding macro calls) in the source code, will be included in the collection of performance metrics process.

At least in some embodiments, the exemplary zDPS command may include a parameter (such as a fifth parameter— "DSN" indicative of desired output options. For example, the user may choose to specify a file name (or data set name) to store collected performance metrics. Yet another parameter, for example a sixth parameter REPEAT, may include information specifying a desired number of iterations to collect performance metrics.

Referring back to FIG. 5, in response to the user request to initiate performance tracing via the exemplary zDPS command, at 506, LRE 144 may read the plurality of the predefined parameter values, such as START (ID1), END (ID2), LEVEL (>5), etc., obtained from the user. Next, LRE 144 may, at 510, continue executing application program 146 (decision 508, no branch) until one of the plurality of macro calls 456, 458, 460, 462 is reached (decision 508, yes branch). At 512, LRE 144 may compare the predefined ID parameter value corresponding to the reached macro call to a value (ID1) of the first parameter (START) specified by the user. If there is no match (decision 512, no branch), then LRE 144 may, at 510, continue executing application program 146. In response to determining that the macro ID matches the ID specified by the user as a starting point for collecting performance metrics (ID1) (decision 512, yes branch), LRE 144 may capture performance metrics 514 for the starting point. In an embodiment, capturing performance metrics 514 may include recording the value of the hardware clock (using, for example, essential runtime services interface 212) as the starting point value.

Next, at 516, LRE 144 may continue executing code of application program 146 until next macro call reached at 518.

In response to arriving at a given macro call (decision 518, yes branch), at 520, LRE 144 may compare the predefined ID parameter value corresponding to the reached macro call to a value (ID2) of the second parameter (END) specified by the user. The reached macro call may not be the desired end point of the segment of code that needs to be measured. Referring back to FIG. 4B, if the user specified starting and ending points as macro calls 456 and 460, once LRE 144 reaches macro call 458 it will compare the ID parameter value corresponding to macro call 458 ('0000000013') to the user specified value ID2 (in this example '0000000014'). In response to determining that the macro ID does not match the ID specified by the user as an ending point of the code segment for which performance metrics are collected (decision 520, no branch), LRE 144, at 522 may compare the predefined level parameter value corresponding to the reached macro call to a performance metrics collection criteria specified by the user as the LEVEL parameter value of the exemplary zDPS command. It should be noted that the LEVEL parameter value may include a comparison operator in addition to a specific numeric value (for example, ">5"). In response to determining that the level parameter corresponding to the reached macro call does not satisfy the user specified criteria (decision 522, no branch), LRE 144 may return back to 516. On the other hand, if the level parameter corresponding to the reached macro call does satisfy the user specified criteria (decision 522, yes branch), at 524, LRE 144 may capture performance metrics for this intermediate point within the segment of code execution of which is being measured. In an embodiment, capturing performance metrics may include recording the value of the hardware clock as the value corresponding to this intermediate point. Subsequently to capturing performance metrics at 524, LRE 144 may return back to 516.

In response to determining that the macro ID matches the ID specified by the user as an ending point of the code segment for which performance metrics are collected (decision 520, yes branch), LRE 144, at 526, may capture performance metrics for the ending point and perform calculations based on the captured performance metrics. For example, in an embodiment, LRE 144 may simply subtract the starting point time value from the ending point time value to determine an elapsed execution time. In various embodiments, performing calculations 526, may include determining elapsed execution time between any two of a plurality of macro calls for which the data was captured in accordance with the user specified granularity criteria. It should be noted that LRE 144, at least in one embodiment, may also determine CPU time consumption by an application program. In an embodiment, each of the plurality of macro calls may include a block of code which may be executed by LRE 144 to measure and accumulate CPU time values.

At 528, LRE 144 may send the collected performance metrics along with the calculation results to a display on a console. Alternatively, LRE 144 may send the captured performance metrics along with the calculation results, for example, to the file corresponding to the file name provided by the user in the DSN parameter. In an embodiment, the captured performance metrics may be stored in an XML (eXtensible Markup Language) format. Once performance metrics are stored in one or more files, these files may be analyzed by a user, for example, via a Graphical User Interface (GUI), which may run in any operating system 132, 142, 152 included in physical computer 110. Alternatively, the user may analyze the captured performance metrics via a variety of software tools running, for example, on a remote computer connected to the physical computer 110.

In summary, the method of performance metrics collection described herein provides flexiblility for capturing performance metrics for a variety of computer programs using different levels of granularity. Advantageously, in accordance with an embodiment of the present invention, fine-grained performance metrics may be collected down to a single line of source code (including single assembler instruction), without recompilation of the monitored computer application programs having a plurality of macro calls inserted therein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the large computer server, partly on the large computer server, as a stand-alone software package, partly on the large computer server and partly on a remote computer or entirely on the remote computer or server. In the latter scenario, the remote computer may be connected to the large computer server through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for collecting one or more performance metrics, the method comprising:
    providing a plurality of source code instructions having a plurality of macro calls among the plurality of source code instructions, wherein at least one of the plurality of macro calls includes a plurality of predetermined parameters and wherein the at least one of the plurality of macro calls is assigned a desired level of granularity;
    executing a plurality of object code instructions corresponding to the plurality of source code instructions;
    receiving a user request to collect the one or more performance metrics, wherein the user request specifies the predetermined parameters, and wherein the predetermined parameters include a starting point, a ending point and the desired level of granularity;
    determining whether the starting and ending points matches a plurality of reached macro call identifiers of least one of the plurality of macro calls;
    comparing, if the starting and ending points does not match the plurality of reached macro call identifiers, a predefined level parameter value with the desired level of granularity of least one of the plurality of macro calls; and collecting, the one or more performance metrics using the identified at least one of the plurality of macro calls, if the predefined level parameter value matches the desired level of granularity.

2. The method of claim 1, wherein the plurality of predetermined parameters uniquely identifies one of the plurality of macro calls.

3. The method of claim 1, wherein the identified at least one of the plurality of macro calls executes a macro program.

4. The method of claim 1, wherein the plurality of macro calls includes a first macro call indicative of a first source code location and a second macro call indicative of a second source code location, wherein the identified at least one of the plurality of macro calls comprises the first macro call, and wherein collecting the one or more performance metrics comprises calculating a value indicating an elapsed execution time of a portion of the plurality of source code instructions, the portion located between the first source code location and the second source code location.

5. The method of claim 1, wherein the one or more performance metrics comprise at least one of an elapsed execution time and CPU time spent during execution of a portion of the plurality of source code instructions.

6. The method of claim 1, wherein the desired level of granularity can be adjusted by a user dynamically using an operating system command.

7. The method of claim 1, wherein collecting the one or more performance metrics comprises generating an XML file.

8. A computer program product for collecting one or more performance metrics, the computer program product comprising one or more computer-readable tangible storage devices, and a plurality of program instructions stored on at least one of the one or more storage devices, the plurality of program instructions comprising:
    program instructions to provide a plurality of source code instructions having a plurality of macro calls among the plurality of source code instructions, wherein at least one of the plurality of macro calls includes a plurality of predetermined parameters and wherein the at least one of the plurality of macro calls is assigned a desired level of granularity;

program instructions to execute a plurality of object code instructions corresponding to the plurality of source code instructions;

program instructions to receive a user request to collect the one or more performance metrics, wherein the user request specifies the predetermined parameters, and wherein the predetermined parameters include a starting point, a ending point and the desired level of granularity;

program instructions to determine whether the starting and ending points matches a plurality of reached macro call identifiers of least one of the plurality of macro calls;

program instructions to compare, if the starting and ending points does not match the plurality of reached macro call identifiers, a predefined level parameter value with the desired level of granularity of least one of the plurality of macro calls; and program instructions to collect, the one or more performance metrics using the identified at least one of the plurality of macro calls, if the predefined level parameter value matches the desired level of granularity.

9. The computer program product of claim 8, wherein the plurality of predetermined parameters uniquely identifies one of the plurality of macro calls.

10. The computer program product of claim 8, wherein the identified at least one of the plurality of macro calls comprises program instructions to execute a macro program.

11. The computer program product of claim 8, wherein the plurality of macro calls includes a first macro call indicative of a first source code location and a second macro call indicative of a second source code location, wherein the identified at least one of the plurality of macro calls comprises the first macro call, and wherein the program instructions to collect the one or more performance metrics comprise program instructions to calculate a value indicating an elapsed execution time of a portion of the plurality of source code instructions, the portion located between the first source code location and the second source code location.

12. The computer program product of claim 8, wherein the one or more performance metrics comprise at least one of an elapsed execution time and CPU time spent during execution of a portion of the plurality of source code instructions.

13. The computer program product of claim 8, wherein the desired level of granularity can be adjusted by a user dynamically using an operating system command.

14. A computer system for collecting one or more performance metrics, the computer system comprising one or more processors, one or more computer-readable tangible storage devices, and a plurality of program instructions stored on at least one of the one or more storage devices for execution by at least one of the one or more processors, the plurality of program instructions comprising:

program instructions to provide a plurality of source code instructions having a plurality of macro calls among the plurality of source code instructions, wherein at least one of the plurality of macro calls includes a plurality of predetermined parameters and wherein the at least one of the plurality of macro calls is assigned a desired level of granularity;

program instructions to execute a plurality of object code instructions corresponding to the plurality of source code instructions;

program instructions to receive a user request to collect the one or more performance metrics, wherein the user request specifies the predetermined parameters, and wherein the predetermined parameters include a starting point, a ending point and the desired level of granularity;

program instructions to determine whether the starting and ending points matches a plurality of reached macro call identifiers of least one of the plurality of macro calls;

program instructions to compare, if the starting and ending points does not match the plurality of reached macro call identifiers, a predefined level parameter value with the desired level of granularity of least one of the plurality of macro calls; and program instructions to collect, the one or more performance metrics using the identified at least one of the plurality of macro calls, if the predefined level parameter value matches the desired level of granularity.

15. The computer system of claim 14, wherein the plurality of predetermined parameters uniquely identifies one of the plurality of macro calls.

16. The computer system of claim 14, wherein the identified at least one of the plurality of macro calls comprises program instructions to execute a macro program.

17. The computer system of claim 14, wherein the plurality of macro calls includes a first macro call indicative of a first source code location and a second macro call indicative of a second source code location, wherein the identified at least one of the plurality of macro calls comprises the first macro call, and wherein the program instructions to collect the one or more performance metrics comprise program instructions to calculate a value indicating an elapsed execution time of a portion of the plurality of source code instructions, the portion located between the first source code location and the second source code location.

* * * * *